US010070294B2

(12) United States Patent
Waters et al.

(10) Patent No.: US 10,070,294 B2
(45) Date of Patent: Sep. 4, 2018

(54) PROCESSING AND REPORTING SITUATIONAL INFORMATION TO EMERGENCY SERVICE PROVIDERS

(75) Inventors: Michael Blayne Waters, Longmont, CO (US); Leslie Ann Brandt, Longmont, CO (US); Gregory Wilfred Bruening, Boulder, CO (US); Douglas John Ertz, Boulder, CO (US); John Lawrence Snapp, Westminster, CO (US); Pavel Despot, Jr., Cambridge, MA (US)

(73) Assignee: West Corporation, Omaha, NE (US)

( * ) Notice: Subject to any disclaimer, the term of this patent is extended or adjusted under 35 U.S.C. 154(b) by 1346 days.

(21) Appl. No.: 11/851,722

(22) Filed: Sep. 7, 2007

(65) Prior Publication Data

US 2009/0067584 A1    Mar. 12, 2009

(51) Int. Cl.
*H04M 11/04*    (2006.01)
*H04W 4/90*    (2018.01)
*H04W 76/50*    (2018.01)

(52) U.S. Cl.
CPC ............. *H04W 4/90* (2018.02); *H04W 76/50* (2018.02)

(58) Field of Classification Search
USPC ..................................................... 379/37–51
See application file for complete search history.

(56) References Cited

U.S. PATENT DOCUMENTS

| | | | |
|---|---|---|---|
| 5,596,625 A | 1/1997 | LeBlanc | |
| 6,574,484 B1 | 6/2003 | Carley | |
| 6,690,294 B1* | 2/2004 | Zierden | G08G 1/052 340/933 |
| 6,775,356 B2 | 8/2004 | Salvucci et al. | |
| 6,992,580 B2 | 1/2006 | Kotzin et al. | |
| 7,016,478 B2* | 3/2006 | Potorny | H04Q 3/0045 379/45 |
| 7,123,693 B2 | 10/2006 | Nelson et al. | |
| 7,130,384 B2 | 10/2006 | Goldman et al. | |
| 7,149,533 B2 | 12/2006 | Laird et al. | |
| 8,000,678 B1* | 8/2011 | Klesper | H04M 11/04 455/404.1 |
| 8,520,805 B2* | 8/2013 | Dickinson | H04M 3/5116 379/38 |
| 2002/0118796 A1 | 8/2002 | Menard et al. | |
| 2002/0193938 A1* | 12/2002 | DeKock | G08G 1/0104 701/117 |
| 2003/0194061 A1 | 10/2003 | Contractor | |
| 2004/0057425 A1* | 3/2004 | Brouwer | H04M 3/42 370/352 |
| 2004/0097243 A1 | 5/2004 | Zellner et al. | |
| 2004/0101166 A1* | 5/2004 | Williams | G01P 3/38 382/104 |
| 2004/0203563 A1 | 10/2004 | Menard | |
| 2004/0247086 A1 | 12/2004 | Menard et al. | |

(Continued)

*Primary Examiner* — Duc Nguyen
*Assistant Examiner* — Assad Mohammed

(57) ABSTRACT

A system and method for processing and reporting situational information to emergency service providers in an emergency service communications network is disclosed. An emergency situation is monitored. Responsive to detecting the emergency situation, information relating to the emergency situation is collected. Then, the information is processed and stored in a database. The processed information is then reported to emergency service providers.

15 Claims, 12 Drawing Sheets

(56) References Cited

U.S. PATENT DOCUMENTS

| | | |
|---|---|---|
| 2005/0201358 A1 | 9/2005 | Nelson et al. |
| 2005/0201528 A1 | 9/2005 | Meer et al. |
| 2005/0201529 A1 | 9/2005 | Nelson et al. |
| 2006/0044407 A1* | 3/2006 | Barbeau ............ G06F 17/30265 348/211.3 |
| 2006/0062354 A1 | 3/2006 | Contractor |
| 2006/0145841 A1* | 7/2006 | Daurensan ......... G08B 13/1961 340/539.22 |
| 2007/0049245 A1* | 3/2007 | Lipman ................... H04L 12/14 455/406 |
| 2007/0139182 A1* | 6/2007 | O'Connor ............ G08B 27/006 340/521 |
| 2007/0159322 A1* | 7/2007 | Garratt Campbell ....................... G08B 25/016 340/539.13 |
| 2007/0206735 A1* | 9/2007 | Silver .................... H04L 12/66 379/88.19 |
| 2007/0263796 A1* | 11/2007 | Patel .................. H04M 7/0036 379/88.01 |
| 2008/0153453 A1* | 6/2008 | Bachmutsky ........... H04W 4/90 455/404.1 |
| 2008/0233984 A1* | 9/2008 | Franklin ....................... 455/466 |
| 2009/0067586 A1* | 3/2009 | Fano ........................ H04M 3/51 379/49 |
| 2009/0252302 A1* | 10/2009 | Monroe .......................... 379/37 |

* cited by examiner

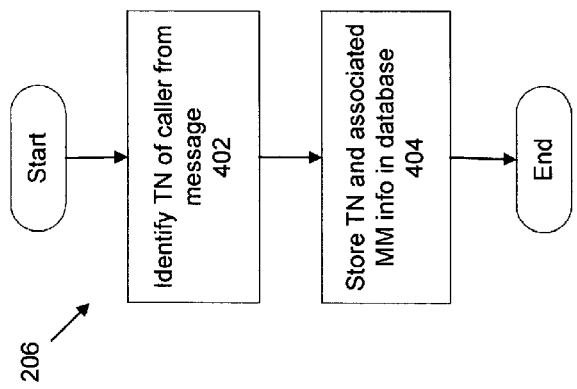

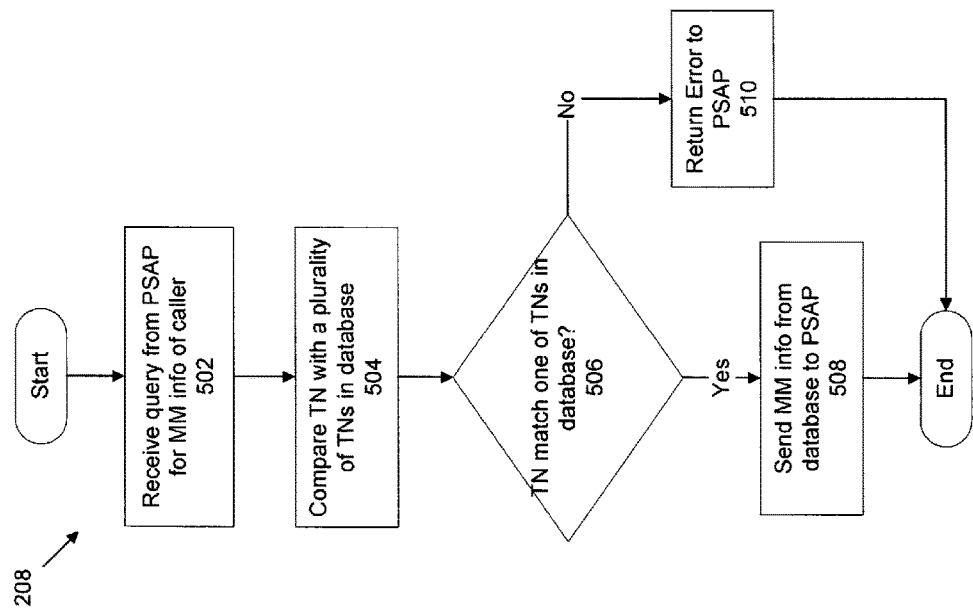

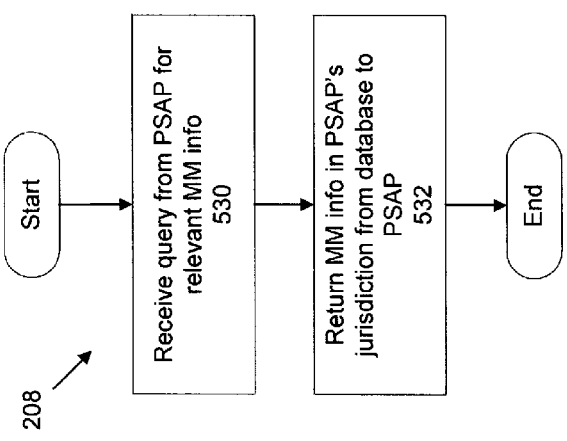

PROCESSING AND REPORTING SITUATIONAL INFORMATION TO EMERGENCY SERVICE PROVIDERS

FIELD OF THE INVENTION

The present disclosure is generally related to an emergency service communications network, and more particularly to processing and reporting situational information to emergency service providers in an emergency service communications network.

BACKGROUND OF THE INVENTION

In an emergency situation, persons involved or bystanders often contact emergency services by placing a 9-1-1 call from their home or cellular phone. An emergency operator at a public safety answering point (PSAP) who received the call takes the information provided by the caller and dispatches necessary emergency service providers to handle the situation. Common emergency service providers that are dispatched include the police, the fire department, emergency medical services (EMS), and the like.

While the information collected from the caller is helpful to emergency service providers, additional information about the situation may be necessary. For example, extent of the property damage and personal injuries, vehicle and driver information, etc. A person involved or bystander may or may not be able to provide such information in an accurate manner. In addition, there may be situations in which the person involved is not available to report, for example, in a kidnapping situation. Therefore, what is needed is ability to better process and report situational information to emergency service providers, such that better emergency responses may be provided.

SUMMARY OF THE INVENTION

The present disclosure provides an improved method and system for processing and reporting situational information to emergency service providers in an emergency service communications network.

The present disclosure describes a method for processing and reporting situational information to emergency service providers. An emergency situation is monitored. Responsive to detecting the emergency situation, information relating to the emergency situation is collected. The collected information is processed and stored in a database. The processed information is then reported to emergency service providers.

The information relating to the emergency situation is collected, in one embodiment, by instructing the caller to send a message having multi-media information using a short code, routing the message to a multi-media messaging carrier, routing the message from the multi-media messaging carrier to a multi-media messaging system aggregator via a packet data servicing node, and forwarding the message from the multi-media messaging system aggregator to the database. Alternatively, the information relating to the emergency situation is collected by recognizing an emergency situation based on the captured traffic and vehicle information, and storing vehicle information associated with the emergency situation to the database.

In one embodiment of the present disclosure, the collected information is processed by identifying a telephone number of the caller from the message, storing the telephone number and multi-media information of the message in the database. In an alternative embodiment, collected information is processed by identifying at least one license or vehicle description from the vehicle information, comparing the at least one license or vehicle description with a plurality of licenses or vehicle descriptions in the database, and determining if a match exists between the at least one license or vehicle description and at least one of the plurality of licenses or vehicle descriptions.

In one embodiment, the processed information to emergency service providers is reported by receiving a query from a public safety answering point, the query comprising a telephone number, comparing the telephone number with a plurality of telephone numbers in the database, determining if a match exists between the telephone number and at least one of the plurality of telephone numbers, and sending the multi-media information of the message to the public safety answering point if a match exists.

In an alternative embodiment, the processed information to emergency service providers is reported by receiving a query from a public safety answering point for relevant multi-media information, and returning all multi-media information associated from the database to the public safety answer point.

In yet another alternative embodiment, the processed information to emergency service providers is reported by receiving a query from a public safety answering point for relevant multi-media information, and returning all multi-media information associated from the database to the public safety answer point.

In still yet another alternative embodiment, the processed information is reported to emergency service providers by locating a public safety answering point located closest to the at least one camera, and sending corresponding vehicle information to the public safety answering point if a match of license or vehicle description exists.

BRIEF DESCRIPTION OF THE DRAWINGS

FIG. 4 depicts a flowchart of an exemplary method for processing the collected information in the database in accordance with a first embodiment of the present disclosure.

FIG. 5A depicts a flowchart of an exemplary method for reporting the processed information to emergency service providers in accordance with a first embodiment of the present disclosure.

FIG. 5C depicts a flowchart of an exemplary method for reporting the processed information to emergency service providers in accordance with a third embodiment of the present disclosure.

DETAILED DESCRIPTION OF THE INVENTION

Figure 1:
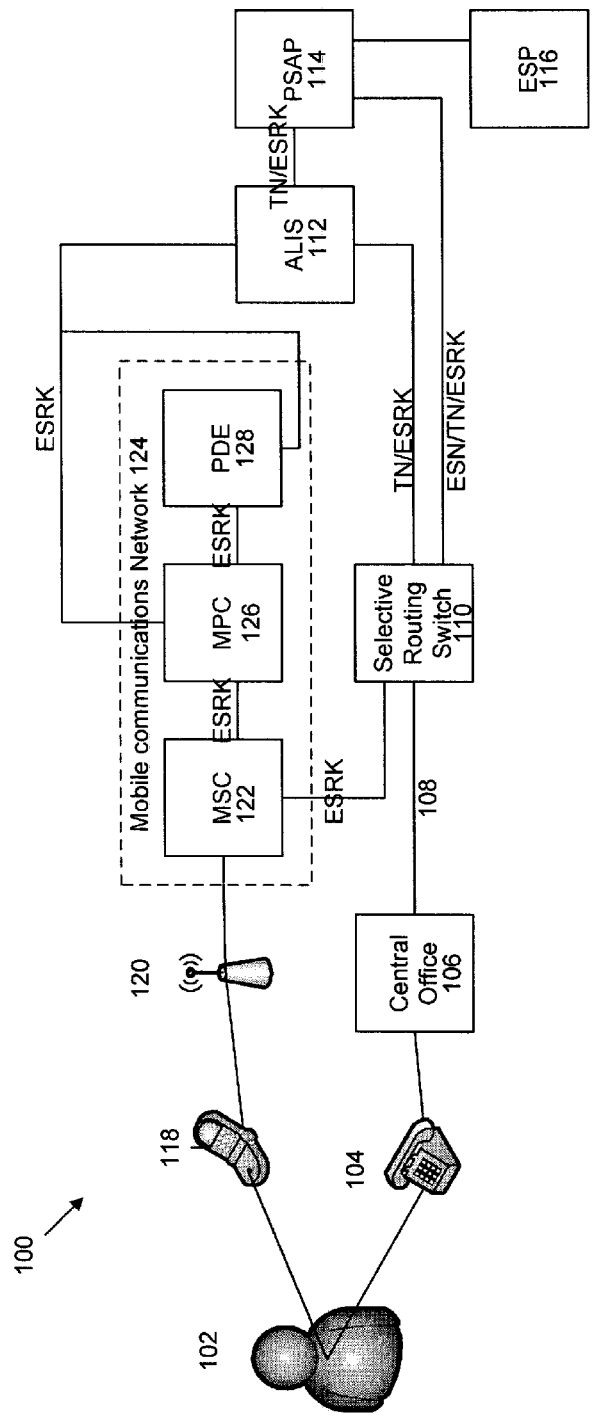
FIG. 1 depicts an exemplary emergency service communications network.

Referring now to FIG. 1, an exemplary emergency service communications network is depicted. In emergency service communications network 100, a caller 102 places an emergency call, for example, by dialing 9-1-1, using a wired telephone 104. Central office 106, which is connected to telephone 104, recognizes from the dialed number that this call requires emergency treatment. Central office 106 then seizes a trunk 108 to selective routing switch 110 and transmits the telephone number (TN) of telephone 104 to selective routing switch 110. Telephone number (TN) uniquely identifies telephone 104 in emergency service communications network 100 and may be used interchangeably with directory number (DN) as an automatic number identification when the directory number is sent from one network component to another.

Once selective routing switch 110 receives the telephone number (TN), it forwards the telephone number to automatic location identification system (ALIS) 112. ALIS 112 in turn selects a public safety answering point (PSAP) 114 to assign the call based on the TN. The public safety answering point (PSAP) may be an answering point closest to the caller or available at the time of the call. The operator at PSAP 114 then identifies an emergency service provider (ESP) 116 to handle the emergency and returns an emergency service number (ESN) associated with the emergency service provider (ESP) 116 to the selective routing switch 110. The selective routing switch then forwards the telephone number (TN) of telephone 104 to PSAP 114 and a call is connected between PSAP 114 and telephone 104.

When PSAP 114 receives the call from telephone 104, it forwards the TN to ALIS 112. ALIS 112 then performs a database lookup using the TN as a key and retrieves records associated with the TN. Examples of records retrieved include caller's location information, such as, a street address, geo-location coordinates, and the like. ALIS 112 then forwards these records to PSAP 114, which then forwards the location information to ESP 116 for its use in providing proper emergency response.

In addition to a wired telephone call, caller 102 may place an emergency call using a cellular phone 118. Cellular phone 118 transmits the call to a cellular tower 120, which forwards the call to a mobile switching center (MSC) 122 within a mobile communications network 124. The mobile switching center (MSC) 122 receives the call and contacts a mobile positioning center (MPC) 126 to determine the location of cellular phone 118 in order to establish a geographical area for routing the call to an appropriate PSAP. The MPC 126 in turn contacts a positioning determining entity 128 to determine the location of cellular phone 118.

Once the location is determined, PDE 128 returns an emergency service routing key (ESRK) as an identifier of the position of cellular phone 118 to mobile positioning center (MPC) 126, which returns the ESRK to MSC 122. MSC 122 then sends the ESRK to selective routing switch 110. Selective routing switch 110 queries the ALIS 112 using the ESRK as a key for an appropriate PSAP serving the geographical area of the caller 102. ALIS 112 determines which PSAP, for example, PSAP 114, to direct the call based on the ESRK and delivers the emergency service number (ESN) of PSAP 114 to selective routing switch 110. The selective routing switch 110 delivers the ESRK to the PSAP 114 and extends the call to PSAP 114.

Similar to the wired call, PSAP 114 uses ESRK of cellular phone 118 as a key to query ALIS 112 for records associated with cellular phone 118. ALIS 112 forwards the ESRK to MPC 126, which queries positioning determining entity (PDE) 128 for geo-location coordinates of the cellular phone 118. Once the coordinates are determined, PDE 128 returns the coordinates to MPC 126, which delivers them to ALIS 112. ALIS 112 then forwards the coordinates to PSAP 114, which then forwards the information to ESP 116 for its use in providing proper emergency response.

While the location information collected from the caller is helpful to emergency service providers, additional information about the situation may be necessary. For example, extent of the property damage and personal injuries, vehicle and driver information, etc. A person involved or bystander may or may not be able to provide such information in an accurate manner. Aspects of the present disclosure provides an improved method and system for processing and reporting situational information to emergency service providers, such that better emergency responses may be provided.

Figure 2:
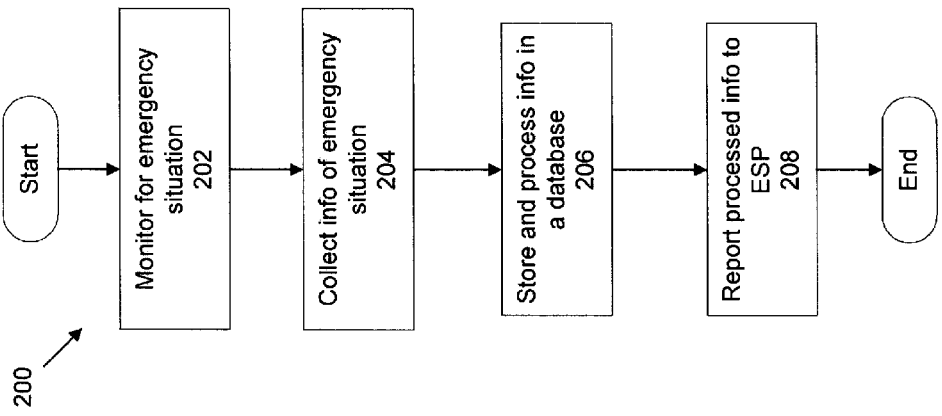
FIG. 2 depicts a flowchart of an exemplary method for processing and reporting emergency situation to emergency service providers in accordance with an embodiment of the present disclosure.

FIG. 2 provides a flowchart of an exemplary method for processing and reporting emergency situation to emergency service providers. This exemplary process 200 begins at step 202 with monitoring for an emergency situation. In one embodiment of the present disclosure, monitoring for an emergency situation may include monitoring for an emergency call initiated from a caller. Alternatively, monitoring for an emergency situation may include instructing cameras in specific geographical areas to capture traffic and vehicle information.

The process continues to step 204 to collect information relating to the emergency situation responsive to detecting an emergency situation. Next, the process continues to step 206 to store and process the collected information in a database. The process then completes at step 208 to report the processed information to emergency service providers.

As discussed above, information in addition to those provided by the caller or ALIS records may be beneficial in providing a better emergency response. For example, if the caller is using a cellular phone having the capability of capturing images of the situation, these images may be beneficial to ESPs in providing a better response. Additional situation information that may be captured by images includes the scene of an accident, pictures of suspects and vehicles involved, etc. With the additional situation information, emergency service providers may provide better responses, including dispatching proper response teams for that situation, rerouting traffic around the scene of the accident, or notifying law enforcement agencies about details of the suspects, etc.

To collect images captured from callers' cellular phone or mobile devices, an aspect of the present disclosure include the ability to integrate with different multi-media messaging carriers (MMSCs). In an illustrative embodiment, an aspect of the present disclosure provides the capability to route multi-media messages received at a multi-media messaging carrier from mobile devices to a multi-media messaging system (MMS) aggregator. The MMS aggregator then forwards multi-media messages to the database. Examples of multi-media contents handled by the MMS aggregator include videos, sound files, graphics, and the like. Alternatively, the multi-media messages may be routed directly from the multi-media messaging carrier to the database.

Figure 3:
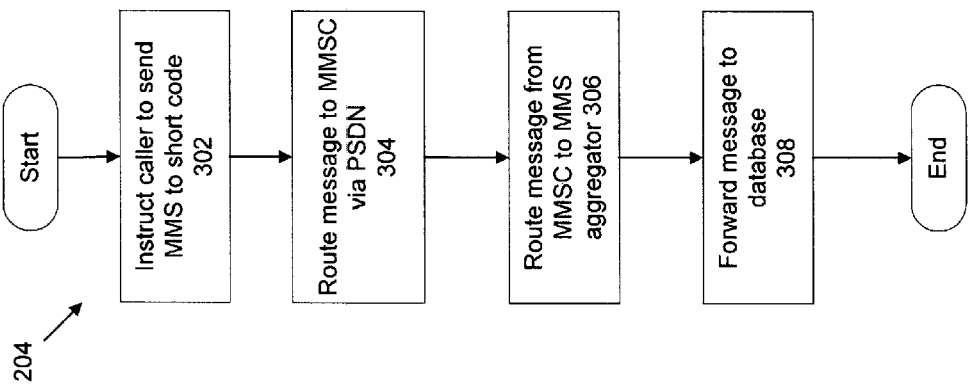
FIG. 3 depicts a flowchart of an exemplary method for collecting multi-media content of the emergency situation in accordance with an embodiment of the present disclosure.

FIG. 3 provides a flowchart of an exemplary method for collecting multi-media content of the emergency situation. The process 204 begins at step 302 with instructing the caller to send a message having multi-media information using a short code. Short codes are special telephone numbers, which are significantly shorter than normal telephone numbers, for addressing a short message or multi-media message from a mobile phone to a service provider. In this example, short codes, such as 911PCIS or 911911, may be used to send multi-media information.

Once the caller sends a multi-media message (MMS), the process continues to step 304 to route the message to the multi-media messaging carrier (MMSC) via a packet data servicing node (PSDN). For example, the message may be route from a mobile device, such as cellular phone 118, to a multi-media messaging carrier (MMSC) via a packet data servicing node (PDSN). PDSN provides an access gateway for the mobile device to an IP network, such as the MMSC. Once the MMSC receives the message, the process continues to step 306 to route the MMS message from the MMSC to the MMS aggregator. The process then completes at step 308 to forward the MMS message from the MMS aggregator to a database. Alternative to routing the MMS message via the MMS aggregator, the process may continue directly from step 304 to step 308 to route the MMS message from the MMSC to the database bypassing the MMS aggregator.

Once the multi-media message is received at the database, the multi-media message is processed by an aspect of the present disclosure. FIG. 4 provides a flowchart of an exemplary method for processing the collected information in the database. The process 206 begins at step 402 with identifying a telephone number (TN) of the caller from the message. The process then completes at step 404 to store the telephone number and associated multi-media information in the database.

Once the multi-media information is processed by the database, an aspect of the present disclosure reports the processed information from the database to proper emergency service providers. FIG. 5A provides a flowchart of a first embodiment of an exemplary method for reporting the processed information to emergency service providers. The process 208 begins at step 502 with receiving a query from a public safety answering point (PSAP) for multi-media information of the caller. As discussed above, the PSAP identifies the caller by a telephone number or emergency service routing key (ESRK). Thus, the query may include either a TN or a ESRK.

The process then continues to step 504 to compare the telephone number with a plurality of telephone numbers stored in the database. Since telephone numbers of callers and associated multi-media information are stored in the database, the process continues to step 506 to determine if a match exists between the telephone number of the caller and at least one of the plurality of telephone numbers stored in the database.

If a match exists between the telephone number of the caller and one of the telephone numbers stored in the database, the process continues to step 508 to send the multi-media information of the message to the public safety answering point. Alternatively, the multi-media information of the message may be displayed to emergency personnel via a user-graphical interface, for example, a web browser interface. Otherwise, an error is returned to PSAP at step 510. Once the multi-media information is received by the PSAP, the PSAP forwards the information to emergency service providers for its use in providing proper response.

Figure 5B:
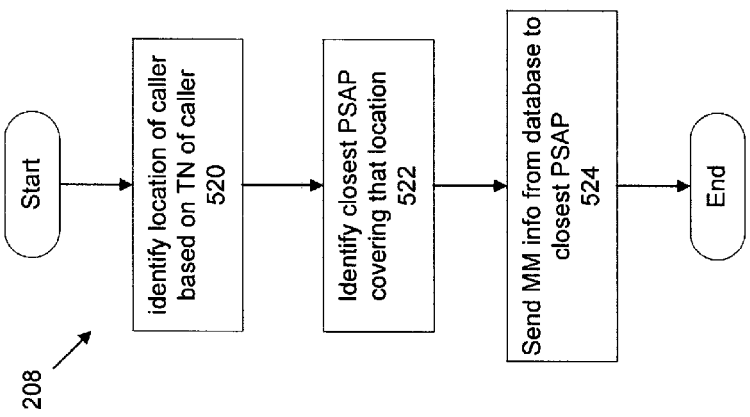
FIG. 5B depicts a flowchart of an exemplary method for reporting the processed information to emergency service providers in accordance with a second embodiment of the present disclosure.

Instead of identifying multi-media information associated with a telephone number or ESRK, an aspect of the present disclosure provides the capability to report the multi-media information automatically based on the location of the caller. FIG. 5B provides a flowchart of a second embodiment of an exemplary method for reporting the processed information to emergency service providers. The process 208 begins at step 520 with locating the location of the caller based on the TN of the caller. For example, an aspect of the present disclosure may leverage existing location infrastructure, such as a geographical information system (GIS) or global positioning system (GPS), to locate the caller based on the telephone number or ESRK. Once the location of the caller is identified, the process continues to step 522 to identify a closest public safety answering point (PSAP) that services that location. Once the closest PSAP is identified, the process continues to step 524 to send the multi-media information from the database to the closest PSAP. One example of sending the multi-media information to the closest PSAP is by secured email. By leverage existing location infrastructure, the multi-media information may be sent automatically to the proper PSAP without the need of a query.

Furthermore, an aspect of the present disclosure may also leverage existing location infrastructure to identify all multi-media information that is relevant to a specific PSAP and return only those information to the PSAP. FIG. 5C provides a flowchart of a third embodiment of an exemplary method for reporting the processed information to emergency service providers. The process 208 begins at step 530 with receiving a query from a specific PSAP for relevant multi-media information. Next, the process continues to step 532 to search the database and return multi-media information within the PSAP's jurisdiction to the PSAP.

Figure 6:
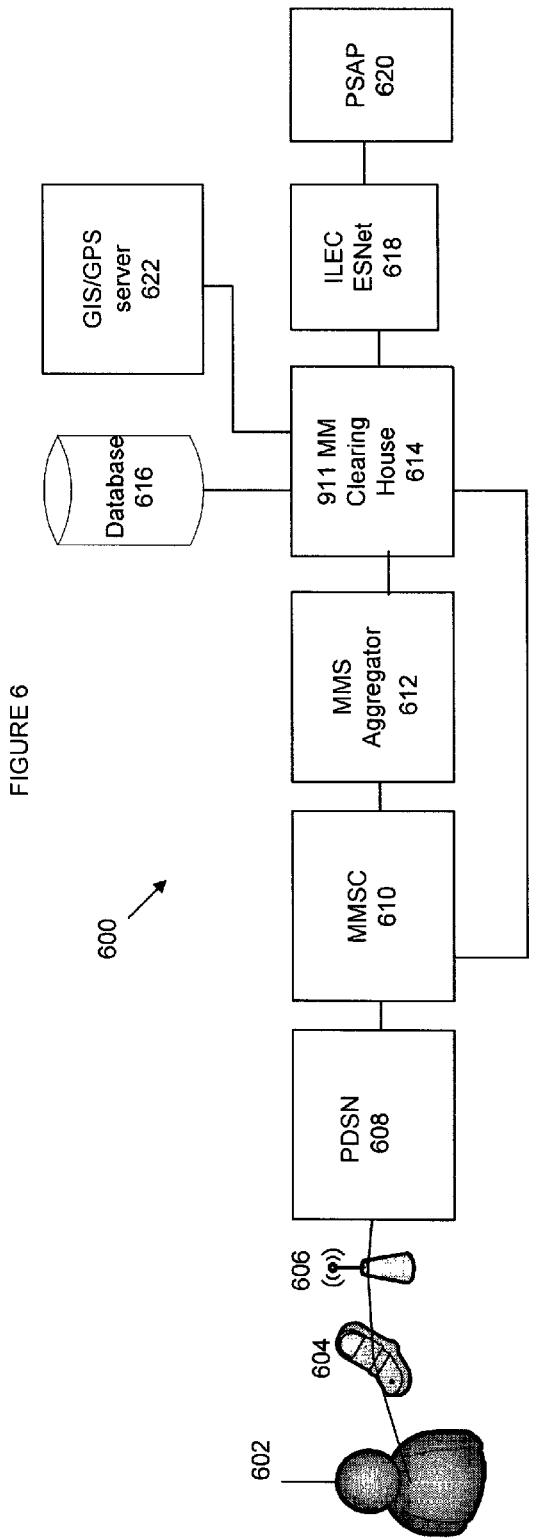
FIG. 6 depicts a first embodiment of a system for processing and reporting situational information to emergency service providers.

FIG. 6 provides a first embodiment of a system for processing and reporting situational information to emergency service providers. Once an emergency situation is reported by a caller 602, caller 602 is instructed by a PSAP operator to send a multi-media messaging system (MMS) message captured from cellular phone 604 using a short code. Cellular tower 606 receives the MMS message from cellular phone 604 and forwards the message to a multi-media messaging carrier (MMSC) 610 via a packet data servicing node (PDSN) 608. The MMSC 610 routes the MMS message to a proper MMS aggregator 612 associated with the carrier. The MMS aggregator 612 then forwards the message to a 911 multi-media clearing house 614 provided by an aspect of the present disclosure. Alternative to routing the message via the MMS aggregator 612, the MMSC 610 may forward the MMS message directly to the 911 multi-media clearing house 614.

Upon receiving the MMS message, the 911 multi-media clearing house 614 stores and processes the message in the database 616 in accordance with the steps described in FIG. 4. An operator at a public safety answering point (PSAP) 620 then sends a query for multi-media information of the caller to a local exchange carrier (LEC) network known as ESNet 618. The ESNet 618 then forwards the query to the 911 multi-media clearing house 614. The query may include a telephone number or ESRK identifying the caller. Upon receiving the query from the ESNet 618, the 911 multi-media clearing house 614 reports the processed information to PSAP 620 in accordance with the steps described in FIGS. 5A, 5B, and 5C.

To leverage existing location infrastructure, the 911 multi-media clearing house 614 may be connected to a GIS or GPS server 622. Thus, in the event of a query for relevant multi-media information from a specific PSAP or to locate a closest PSAP for a caller, the 911 multi-media clearing house 614 may perform a look up of the coverage of the PSAP before reporting multi-media information in database 616 to the PSAP 620.

As discussed above, there may be situations in which the person involved is not available to report, for example, in a kidnapping situation. Aspects of the present disclosure provide an improved method and system for processing and reporting situational information that otherwise is unavailable in some situations. For example, to monitor for an emergency situation, an aspect of the present disclosure may instruct at least one camera at specific geographical locations to capture traffic and vehicle information. An aspect of the present disclosure may recognize an emergency situation based on the captured traffic and vehicle information and collect vehicle information associated with the situation.

Figure 7:
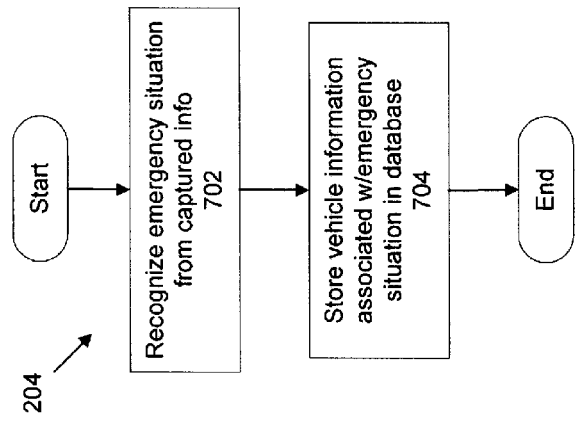
FIG. 7 depicts a flowchart of an exemplary method for collecting information relating to the emergency situation in accordance with a second embodiment of the present disclosure.

FIG. 7 provides a flowchart of an exemplary method for collecting information relating to the emergency situation. The process 204 begins at step 702 with recognizing an emergency situation based on traffic and vehicle information captured by the at least one camera. Next, the process continues to step 704 to store vehicle information associated with the emergency situation in the database. The collected information may then be processed in the database.

Figure 8:
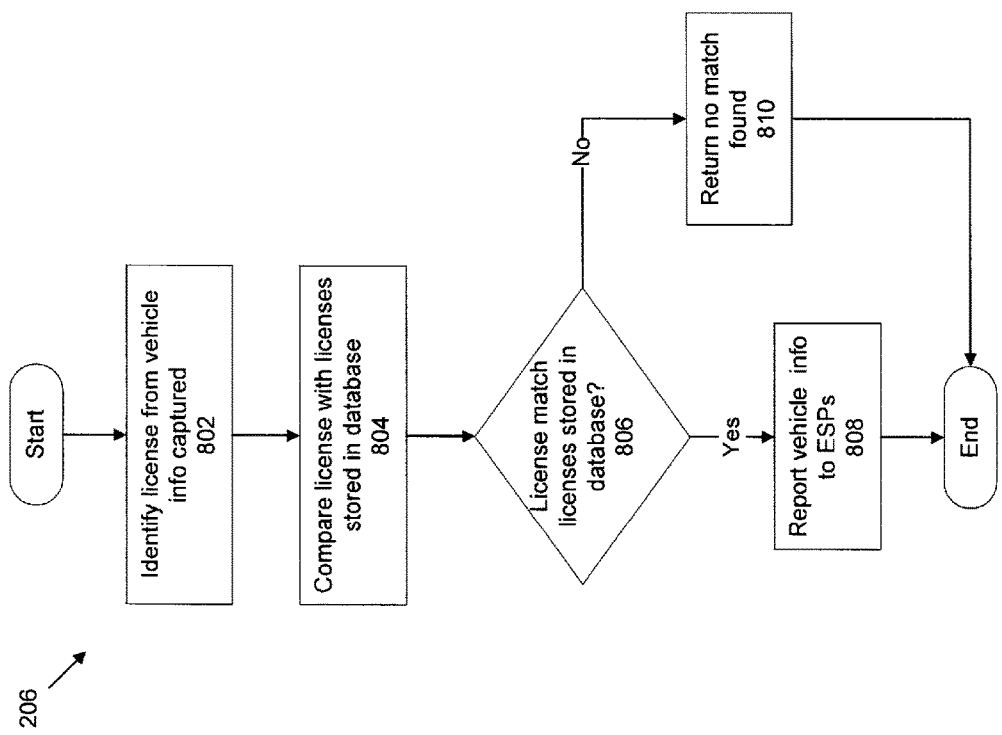
FIG. 8 depicts a flowchart of an exemplary method for processing the collected information in the database in accordance with a second embodiment of the present disclosure.

FIG. 8 provides a flowchart of an exemplary method for processing the collected information in the database. The process 206 begins at step 802 with identifying a license from the vehicle information captured by the cameras. The process then continues to step 804 to compare the license with a plurality of licenses stored in the database. The process then continues to step 806 to determine if a match exists between the license and the licenses stored in the database. In this example, the database comprises vehicle information obtained from law enforcement agencies, including licenses, vehicle descriptions, owner information, etc.

If a match exists between the license and licenses stored in the database, the process continues to step 808 to report the vehicle information to PSAP. Otherwise, a no match found message is returned at step 810. While the above steps described are directed to licenses stored in a database, other types of vehicle information may be processed in the database without departing the scope and spirit of the present disclosure. For example, vehicle descriptions and owner information may also be processed in the database.

Figure 9:
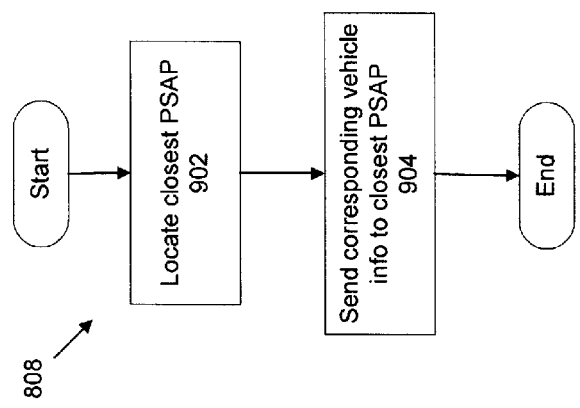
FIG. 9 depicts a flowchart of an exemplary method for reporting the processed information to emergency service providers in accordance with a fourth embodiment of the present disclosure.

Once a match exists between the captured information and vehicle information stored in the database, aspects of the present disclosure may report the processed information to PSAP which in turns forwards the information to emergency service providers for proper response. FIG. 9 provides a flowchart of a fourth embodiment of an exemplary method for reporting the processed information to emergency service providers. The process 808 begins at step 902 with locating a public safety answering point (PSAP) closest to the at least one camera. As discussed above, the nearest PSAP may be located based on the telephone number or the emergency service routing key of the caller. The process then continues to step 904 to send corresponding vehicle information to the closest PSAP. Corresponding vehicle information sent to PSAP may include owner information, owner driving records, vehicle address, etc.

To provide the capability of capturing traffic and vehicle information, an aspect of the present disclosure includes the capability to integrate with a traffic camera system, such as Intellicast system. In addition, an aspect of the present disclosure includes the capability to integrate with geographical information system (GIS) for providing emergency service zone information.

Figure 10:
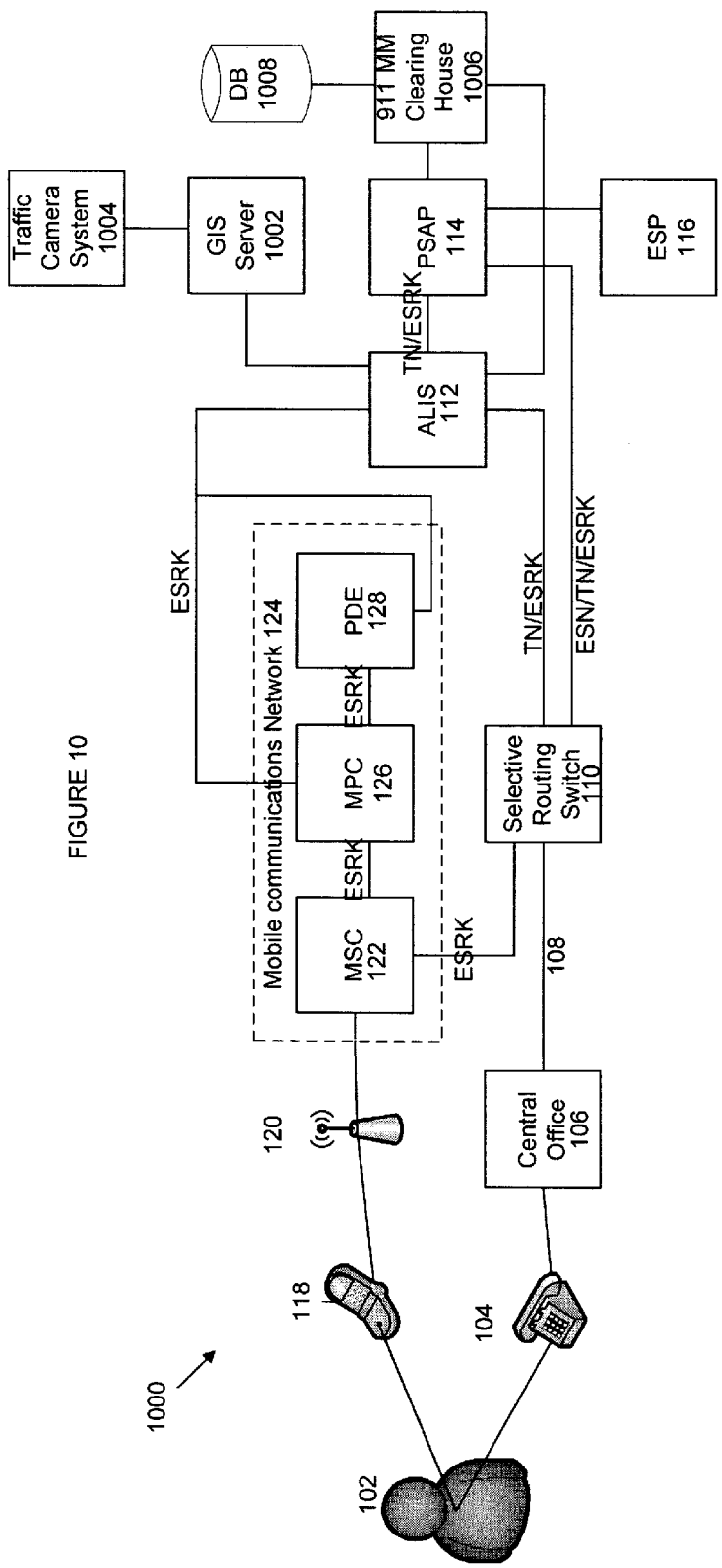
FIG. 10 depicts a second embodiment of a system for processing and reporting situational information to emergency service providers.

FIG. 10 provides a second embodiment of a system for processing and reporting situational information to emergency service providers. In addition to network components described in FIG. 1, system 1000 comprises a GIS server 1002 that provides emergency service zone information. Within each emergency service zone, a traffic camera system 1004 manages cameras that are set up to capture traffic and vehicle information in specific geographical areas for that zone. For example, a GIS server 1002 includes emergency service zone information for the city of Dallas and traffic camera system 1004 manages all the cameras that are set up in the city of Dallas to capture traffic and vehicle information.

GIS server 1002 is connected to automated location identification system (ALIS) 112. In one embodiment, a caller, such as caller 102, may report an emergency situation. Once a call is established between PSAP 114 and caller 102, PSAP 114 may request traffic and vehicle information surrounding caller 102 from a 911 multi-media clearing house 1006. In turn, 911 multi-media clearing house 906 may query ALIS 112 for cameras located near caller 102. ALIS 112 then performs a lookup of nearby cameras using the GIS server 1002 and returns captured traffic and vehicle information. 911 multi-media clearing house 1006 may then store and process the information in database 1008 in accordance with the steps described in FIG. 7 and report the processed information to PSAP 114 in accordance with the steps described in FIG. 8.

Alternatively, the 911 multi-media clearing house 1006 may monitor for an emergency situation by recognizing the situation based on the captured traffic and vehicle information. The 911 multi-media clearing house 1006 may store and process the vehicle information in accordance with the steps described in FIGS. 7 and 8 and report the processed information to emergency service providers in accordance with the steps described in FIG. 9.

In summary, aspects of the present disclosure provide an improved method and system for processing and reporting situational information to emergency service providers. The situation information may be images, videos, sound files captured by an emergency caller using a cellular phone. Alternatively, situational information may be traffic and vehicle information captured by cameras installed at specific geographical areas. Aspects of the present disclosure may process the captured information by identifying multi-media information from a message or corresponding traffic and vehicle information from a captured image. The multi-media information and the corresponding vehicle information may be reported to emergency service providers for better emergency response.

In addition to multi-media information being sent using the multi-media messages, the situation information may be sent using various types of message formats. For example, Instant Messages (IMs) and short messages may be sent from a mobile unit to the PSAP via a short message service (SMS) application or center without departing the spirit and scope of the present disclosure.

Systems and methods have been shown and/or described in the above embodiments for processing and reporting situational information to emergency service providers. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

What is claimed is:

1. A method for processing and reporting situational information to emergency service providers, the method comprising:
    monitoring for an emergency situation;
    responsive to detecting the emergency situation, collecting, from a cellular phone, information relating to the detected emergency situation, wherein the collecting of the information comprises instructing a caller to use a short code to send a message having multi-media information comprising one or more of video, sound, and images of the emergency situation to the emergency service providers and instructing one or more cameras of one or more mobile devices in a specific geographic area to send captured traffic and vehicle information;
    identifying a location of the caller based on the telephone number and by leveraging a geographical information system and a global position system;
    identifying a closest public safety answering point to the location;
    when the closest public safety answering point to the location is available, sending the multi-media information of the message to the closest public safety answering point;
    when the closest public safety answering point to the location is not available, sending the multi-media information of the message to an available public safety answering point;
    storing and processing the information in a database, wherein the processing of the information comprises identifying a telephone number of the caller, and storing the telephone number of the caller and the multi-media information in the database; and
    reporting the processed information to the emergency service providers when the telephone number of the caller matches a telephone number identified by the emergency service providers.

2. The method of claim 1, wherein the detecting of the emergency situation comprises:
    receiving an emergency call from the cellular phone of the caller.

3. The method of claim 2, wherein the collecting of the information relating to the emergency situation comprises:
    routing the message to a multi-media messaging carrier;
    routing the message from the multi-media messaging carrier to a multi-media messaging system aggregator via a packet data servicing node; and
    forwarding the message from the multi-media messaging system aggregator to the database.

4. The method of claim 1, wherein the reporting of the processed information to the emergency service providers comprises:
    receiving a query from a public safety answering point, the query comprising a telephone number;
    comparing the telephone number with a plurality of telephone numbers in the database;
    determining whether a match exists between the telephone number and at least one of the plurality of telephone numbers; and
    sending the multi-media information of the message to the public safety answering point when a match exists.

5. The method of claim 4, wherein the reporting of the processed information to the emergency service providers comprises:
    receiving a query from a public safety answering point for relevant multi-media information; and
    returning all multi-media information associated from the database to the public safety answer point.

6. The method of claim 1, wherein the monitoring for the emergency situation comprises:
    instructing at least one camera at a geographical location to capture traffic and vehicle information.

7. The method of claim 6, wherein the collecting of the information relating to the emergency situation comprises:
    recognizing the emergency situation based on the captured traffic and vehicle information; and
    storing vehicle information associated with the emergency situation to the database.

8. The method of claim 6, wherein the processing of the information from the database comprises:
    identifying at least one license from the vehicle information;
    comparing the at least one license with a plurality of licenses in the database; and
    determining whether a match exists between the at least one license and at least one of the plurality of licenses.

9. The method of claim 1, wherein the reporting of the processed information to the emergency service providers comprises:
    locating a public safety answering point located closest to the at least one camera; and
    sending corresponding vehicle information to the public safety answering point when a match of license or vehicle description exists.

10. A communications network configured to process and report situational information to emergency service providers, comprising:
    at least one mobile unit used by a caller;
    at least one multi-media messaging carrier communicably coupled to the at least one mobile unit;
    at least one multi-media messaging system aggregator;
    at least one public safety answering point; and
    at least one multi-media clearing house comprising at least one database, the at least one multi-media clearing house configured to:
        monitor for an emergency situation,
        collect, from the at least one mobile unit, information relating to the emergency situation,
        identify, via a communicably coupled geographical location server, a location of the caller based on the telephone number and by leveraging a geographical information system and a global position system,
        identify a closest public safety answering point to the location, when the closest public safety answering point to the location is available, send the multi-media information of the message to the closest public safety answering point, when the closest public safety answering point to the location is not available, send the multi-media information of the message to an available public safety answering point, store and process the information in the at least one database, wherein the processing of the information comprises identifying a telephone number of the caller, and store the telephone number of the caller and the multi-media information in the database, and report the processed information to the at least one public safety answering point when a telephone number of the caller matches a telephone number identified by the at least one public safety answering point, wherein the collecting of the information comprises instructing the caller to use a short code to send a message having multi-media information comprising one or more of video, sound, and images of the emergency situation to the emergency service providers and instructing one or more cameras of one or more mobile device in a specific geographic area to send captured traffic and vehicle information to the emergency service providers.

11. The communications network of claim 10, wherein the at least one multi-media clearing house is further configured to route the message to the at least one multi-media messaging carrier, route the message from the at least one multi-media messaging carrier to the at least one multi-media messaging system aggregator via a packet data servicing node, and forward the message from the at least one multi-media messaging system aggregator to the at least one database.

12. The communications network of claim 10, wherein the at least one multi-media clearing house is further configured to receive a query from the at least one public safety answering point, the query comprising a telephone number, compare the telephone number with a plurality of telephone numbers in the at least one database, determine whether a match exists between the telephone number and at least one of the plurality of telephone numbers, and send the multi-media information of the message to the at least one public safety answering point when a match exists.

13. The communication network of claim 10, wherein the at least one multi-media clearing house is further configured to receive a query from the at least one public safety answering point for all relevant multi-media information and return all multi-media information associated from the database to the at least one public safety answer point.

14. A communications network configured to process and report situational information to emergency service providers, comprising:

at least one traffic camera configured to capture traffic and vehicle information at a geographical location;

at least one public safety answering point; and at least one multi-media clearing house comprising at least one database, the at least one multi-media clearing house being configured to:

monitor for an emergency situation, collect, from a mobile device, information relating to the emergency situation, identify, via a communicably coupled geographical location server, a location of the caller based on the telephone number and by leveraging a geographical information system and a global position system, identify a closest public safety answering point to the location, when the closest public safety answering point to the location is available, send the multi-media information of the message to the closest public safety answering point, when the closest public safety answering point to the location is not available, send the multi-media information of the message to an available public safety answering point, store and process the information in the at least one database, wherein the processing of the information comprises identifying a telephone number of the caller, and storing the telephone number of the caller and the multi-media information in the database, and report the processed information to the at least one public safety answering point when a telephone number of the caller matches a telephone number identified by the public safety answering point, wherein the collecting of the information comprises instructing a caller to use a short code to send a message having multi-media information comprising one or more of video, sound, and images of the emergency situation to the emergency service providers, and the at least one multi-media clearing house is further configured to instruct at least one camera of at least one mobile device at the geographical location to capture traffic and vehicle information.

15. The communications network of claim 14, wherein the at least one multi-media clearing house is further configured to identify at least one license from the vehicle information, compare the at least one license with a plurality of licenses in the at least one database, and determine whether a match exists between the at least one license and at least one of the plurality of licenses.

* * * * *